June 15, 1926.
M. RUBY
DISK HARROW
Filed July 20, 1925   2 Sheets-Sheet 1
1,588,910
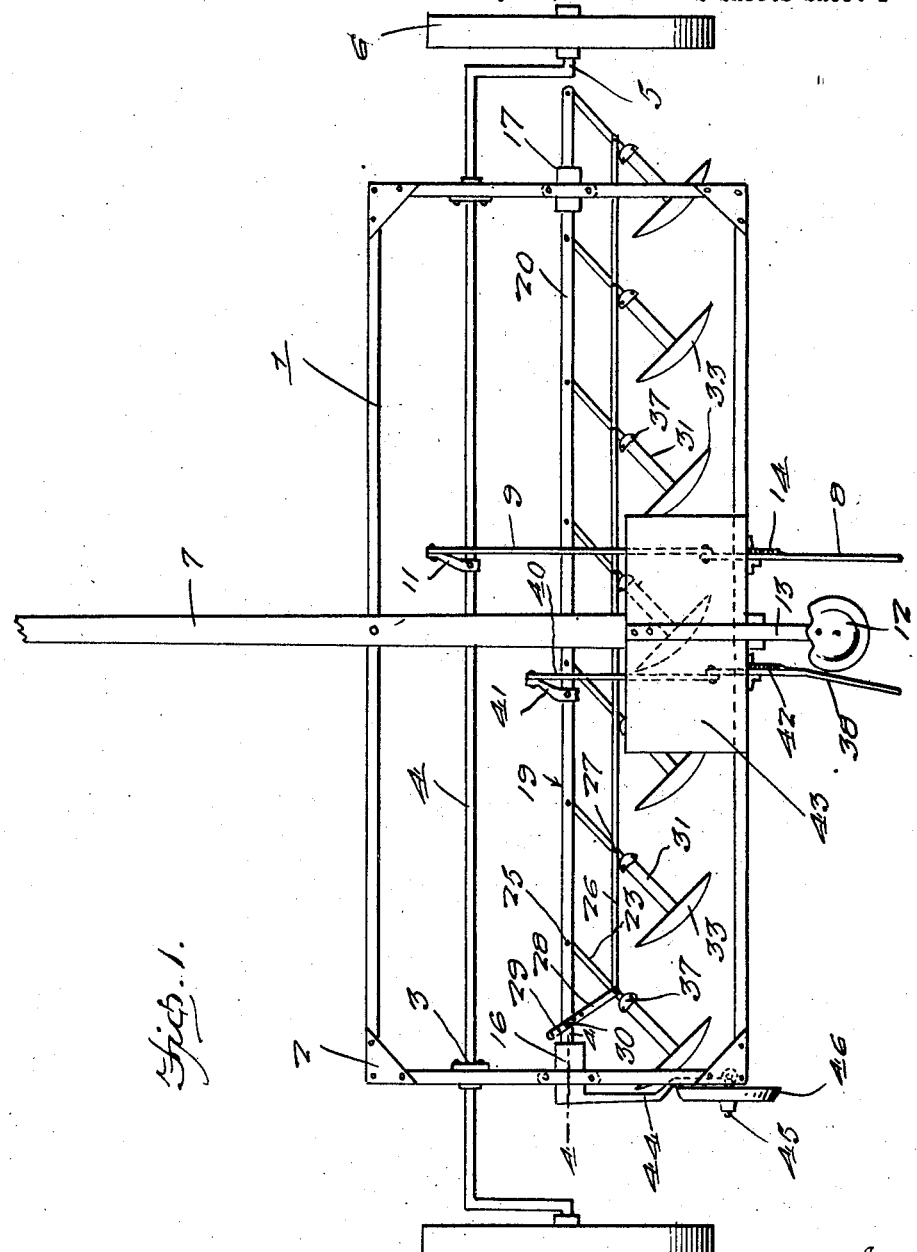
Inventor
M. Ruby
By Clarence A. O'Brien
Attorney June 15, 1926.

M. RUBY

DISK HARROW

Filed July 20, 1925    2 Sheets-Sheet 2

1,588,910

Patented June 15, 1926.

1,588,910

UNITED STATES PATENT OFFICE.

MICHAEL RUBY, OF THURMAN, COLORADO.

DISK HARROW.

Application filed July 20, 1925. Serial No. 44,864.

This invention relates to improvements in disk harrows and has for its principal object to provide an agricultural implement of the above mentioned character which will level the soil very easily and efficiently when in operation, means being provided for raising and lowering the disks.

A further object of the invention is to provide a disk harrow of the above mentioned character wherein the same includes a plurality of interconnected disks whereby the same are actuated simultaneously, said disks being adapted to be disposed at various angles, additional means being provided for facilitating the rotation of the disks during the operation of the harrow.

A further object is to provide a disk harrow which includes a wheeled frame, means being provided for supporting a plurality of disks on the frame so as to facilitate the simultaneous actuation of the disks when raising or lowering the same, a furrow wheel being associated with the frame whereby the harrow will be properly guided during its movement along the ground.

A further object is to provide a disk harrow of the above mentioned character which is simple in construction, inexpensive, and furthermore adapted to the purposes for which the same is designed.

Other objects and advantages of this invention will become apparent during the course of the following description.

In the accompanying drawing forming part of this specification and in which like numerals are employed to designate like parts throughout the same:

Figure 1 is a top plan view of the disk harrow embodying my invention,

Fig. 2 is a side elevation thereof,

Fig. 3 is a fragmentary detail of one of the disks showing the manner in which the same is supported on the spindle, and further illustrating the connection between the spindle and the draw bar, and Fig. 4 is a sectional view taken approximately on line 4—4 of Fig. 1.

In the drawings wherein for the purpose of illustration is shown the preferred embodiment of my invention, the numeral 1 designate generally the substantially rectangular shaped frame forming a part of my improved disk harrow. This frame is formed of substantially tubular material and is rectangular in cross section as clearly ilustrated in Fig. 4. Suitable braces 2 in the form of triangular shaped plates are secured at the respective corners of the frames.

Extending longitudinally of the frame and journaled in suitable bearings 3 provided therefor at the respective ends of the frame is the axle 4. The outer ends of the axle extend for a suitable distance beyond the respective ends of the frame and terminate in the crank portion 5 on which are supported the ground engaging wheels 6. Extending transversely on the intermediate portion of the frame and projecting forwardly thereof is the tongue 7 whereby a means is provided for connecting the harrow to the draft animals.

For the purpose of rotating the axle 4 so that the ground engaging wheels 6 may be swung upwardly out of engagement with the ground when the agricultural implement is in operation, there is provided the lever 8 which is pivotally supported adjacent its lower end on the rear longitudinally extending side of the frame.

The lower end of this lever is pivotally connected to a rod 9 at the rear end thereof as indicated at 10, the forward end of the rod 9 being pivotally connected to an arm 11 which is secured on the intermediate portion of the axle 4 and extends upwardly therefrom. The upper free end of the lever 8 is disposed within close proximity to the seat 12, the support therefor being shown at 13, and this seat is located at the rear of the intermediate portion of the frame.

A pawl and ratchet mechanism designated generally by the numeral 14 is associated with the lever 8 and the frame for holding the lever in its various adjusted positions so that when the lever is swung in one direction, the wheels 6 will be held out of engagement with the ground so that the same will not interfere with the operation of the disks hereinafter to be more fully described.

Journaled in suitable bearings 15 which are supported below the intermediate portions of the ends of the frame 1 are the sleeves 16 and 17 respectively. The securing means for the bearings 15 is illustrated at 18. A draw bar designated generally by the numeral 19 and extending longitudinally of the frame 1 comprises a pair of spaced upper and lower strips 20 and 21 respectively, the end portions of these strips being bent inwardly as at 22 and then disposed outwardly in abutting relation, the abutting portions of the strips at the respective ends thereof being fitted in the respective sleeves 16 and 17 in the manner as more clearly illustrated in Fig. 4.

A plurality of elongated spindles 23 are provided at their forward ends with the enlarged substantially rectangular-shaped heads 24. These heads are pivotally supported between the spaced strips 20 and 21 of the draw bar 19 at spaced intervals through the medium of pivot pins 25. The spindles are pivotally connected together at their intermediate portions through the medium of the elongated connecting bar 26. The connection between the spindles and the bar 26 is shown at 27. This construction provides a means whereby the spindles will be adapted for simultaneous operation as will be hereinafter more fully described.

One end of the spindle connecting bar 26 is pivotally secured to a link 28, said link being provided with a series of spaced openings 29 in the other end thereof and each of these openings is adapted to independently engage a suitable pin 30 which extends upwardly from the draw bar 19 adjacent the end thereof which is fitted in the sleeve 16 so that the angle at which the spindles are disposed may be regulated.

Loosely supported on the rear free end of each spindle 23 is the elongated sleeve or tubular member 31, the outer end thereof being flanged as at 32 and secured to the concaved face of the disk 33, the peripheral edge of which is sharpened as indicated at 24. The securing means for the disk is illustrated at 35. The upper end of each sleeve has formed thereon an annular flange 36 which provides a collar, the same cooperating with the split clamp 37 which is secured on each spindle adjacent the pivotal connection between the spindle and the spindle connecting bar 26 and the purpose of the split clamp and the collar and each spindle is to prevent the displacement of the sleeve and the disk carried thereby from each of the spindles.

The provision of the sleeve permits the disk carried by the lower ends of the respective sleeves to rotate on the spindle when the disks are in engagement with the ground and during the forward movement of the harrow. For the purpose of raising the disks out of engagement with the ground to an inoperative position, I have provided the lever 38, the same being pivotally supported adjacent its lower end on the rear longitudinal side of the frame as at 39, the lever being located on the opposite side of the seat 12 within close proximity to the operator. The lower end of the lever 38 is pivotally connected to an elongated rod 40, and this rod is connected at its forward end to the upper end of the arm 41, the same being secured on the draw bar 19 as clearly illustrated in Fig. 1.

It is of course understood that the sleeves 16 and 17 are journaled in the bearings 15 provided therefor at the respective ends of the frame 1 so as to permit the rotation of the sleeves as well as the draw bar when the lever 38 is actuated, the pawl and ratchet mechanism designated generally by the numeral 42 being associated with the lever and the rear side of the frame for holding the former in any desired adjusted position.

A suitable platform 43 is provided at the rear side of the frame at the intermediate portion thereof. Carried by the outer end of the sleeve 16 and extending rearwardly therefrom is the arm 44, said arm being normally disposed downwardly and a suitable stub axle 45 is associated with the rear free end of the arm and supports thereof the furrow wheel 46. This furrow wheel is located in close proximity to the disk 33 which is disposed adjacent the arm 44 and this wheel 46 is adapted to travel in the furrow made on the left hand side for the purposes well known in the art. The furrow wheel 46 will be actuated simultaneously with the disks 33 due to the construction of the sleeve 16 in which is fitted one end of the draw bar and also on which is formed the arm which supports the furrow wheel.

It will thus be seen that a disk harrow of the wheeled type has been provided wherein the disks will all rotate in one direction so as to easily and efficiently level the soil when in engagement with the ground, the ground engaging wheels as well as the disks being adapted to be raised or lowered independently by the operator of the harrow without any difficulty.

If desired, a drill feeder hopper and a spout is associated therewith and may be mounted on the frame and may be connected up with the ground engaging wheels for simultaneous operation therewith.

While I have shown the preferred embodiment of my invention, it is to be understood that various changes in the size, shape and arrangement of parts may be resorted to without departing from the spirit or sacrificing any of the advantages of the appended claims.

Having thus described my invention, what I claim as new is:—

1. A disk harrow comprising a wheeled frame, a pair of sleeves journaled in the respective sides of the frame, a draw bar having its respective ends fitted in the respective sleeves, a plurality of spindles secured at their forward ends on said draw bar at spaced intervals, sleeves rotatably mounted on the rear ends of the spindles, a disk secured on the lower end of each of said sleeves, an arm formed on one of said first mentioned sleeves and extending laterally therefrom, and a furrow wheel carried by the outer end of said arm, and means for actuating the draw bar for raising the disks and the furrow wheel out of engagement with the ground.

2. A disk harrow comprising a wheeled frame, a pair of sleeves journaled in the respective sides of the frame, a draw bar comprising spaced upper and lower elongated strips, the ends of the strips being disposed in abutting relation and fitted in the inner ends of the respective sleeves, a plurality of spindles, the forward ends thereof being provided with heads, said heads being pivotally secured between the upper and lower strips of the draw bar at spaced intervals, a spindle connecting bar extending across the intermediate portions of the spindles and secured thereto, means for adjustably securing the spindle connecting bar to said draw bar for adjusting the angles at which the spindles are to be disposed, and disks carried by the rear ends of the spindles, and means for actuating the draw bar to raise and lower said disks.

3. A disk harrow comprising a wheeled frame, a pair of sleeves journaled in the respective sides of the frame, a draw bar comprising spaced upper and lower elongated strips, the ends of the strips being disposed in abutting relation and fitted in the inner ends of the respective sleeves, a plurality of spindles, the forward ends thereof being provided with heads, said heads being pivotally secured between the upper and lower strips of the draw bar at spaced intervals, a spindle connecting bar extending across the intermediate portions of the spindles and secured thereto, means for adjustably securing the spindle connecting bar to said draw bar for adjusting the angles at which the spindles are to be disposed, sleeves rotatably mounted on the rear ends of the spindles, a disk secured on the lower end of each of said sleeves, and means for actuating the draw bar to raise and lower the disks.

4. A disk harrow comprising a wheeled frame, a pair of sleeves journaled in the respective sides of the frame, a draw bar comprising spaced upper and lower elongated strips, the ends of the strips being disposed in abutting relation and fitted in the inner ends of the respective sleeves, a plurality of spindles, the forward ends thereof being provided with heads, said heads being pivotally secured between the upper and lower strips of the draw bar at spaced intervals, a spindle connecting bar extending across the intermediate portions of the spindles and secured thereto, means for adjustably securing the spindle connecting bar to said draw bar for adjusting the angles at which the spindles are to be disposed, sleeves rotatably mounted on the rear ends of the spindles, a disk carried on the lower end of each of said sleeves, a laterally extending arm formed on one of the first mentioned sleeves, a furrow wheel carried by the outer end of said arm, and means for actuating the draw bar for raising and lowering the disks and the furrow wheel.

In testimony whereof I affix my signature.

MICHAEL RUBY.